United States Patent
Giorelli et al.

(10) Patent No.: US 11,318,936 B2
(45) Date of Patent: May 3, 2022

(54) ADAPTIVE CONTROL METHOD AND SYSTEM IN A TERRESTRIAL VEHICLE FOR TRACKING A ROUTE, PARTICULARLY IN AN AUTONOMOUS DRIVING SCENARIO

(71) Applicant: MAGNETI MARELLI S.p.A., Corbetta (IT)

(72) Inventors: Michele Giorelli, Turin (IT); Matteo Corno, Milan (IT); Federico Roselli, Milan (IT); Sergio Matteo Savaresi, Cremona (IT)

(73) Assignee: Magneti Marelli S.p.A., Corbetta (IT)

( * ) Notice: Subject to any disclaimer, the term of this patent is extended or adjusted under 35 U.S.C. 154(b) by 278 days.

(21) Appl. No.: 16/345,060

(22) PCT Filed: Oct. 31, 2017

(86) PCT No.: PCT/IB2017/056753
§ 371 (c)(1),
(2) Date: Apr. 30, 2019

(87) PCT Pub. No.: WO2018/078606
PCT Pub. Date: May 3, 2018

(65) Prior Publication Data
US 2019/0276016 A1 Sep. 12, 2019

(30) Foreign Application Priority Data
Oct. 31, 2016 (IT) .................... 102016000109633

(51) Int. Cl.
*B60W 30/00* (2006.01)
*B60W 30/10* (2006.01)
(Continued)

(52) U.S. Cl.
CPC ............ *B60W 30/10* (2013.01); *B60W 10/20* (2013.01); *B60W 40/13* (2013.01); *B62D 15/025* (2013.01);
(Continued)

(58) Field of Classification Search
None
See application file for complete search history.

(56) References Cited

U.S. PATENT DOCUMENTS 10,671,070 B2 * 6/2020 Zhu ................. G05D 1/0212
10,795,367 B2 * 10/2020 Milstein ............. G05D 1/0231
(Continued)

FOREIGN PATENT DOCUMENTS

| EP | 2592919 A1 | 5/2013 |
| WO | 2009155228 A1 | 12/2009 |
| WO | 2012007549 A1 | 1/2012 |

OTHER PUBLICATIONS

International Search Report and Written Opinion of the International Searching Authority for PCT International Application No. PCT/IB2017/056753 dated Jan. 24, 2018.
(Continued)

*Primary Examiner* — Jonathan M Dager
(74) *Attorney, Agent, or Firm* — Howard & Howard Attorneys PLLC

(57) ABSTRACT

A method for controlling the lateral movement of a terrestrial vehicle arranged to track a predetermined trajectory, particularly in an assisted driving or autonomous driving scenario, comprising: determining a lateral offset of the vehicle center of mass from the predetermined trajectory; determining a look-ahead error defined as a distance of a virtual look-ahead position of the vehicle center of mass from the predetermined trajectory; and controlling the steering angle of the vehicle so as to also minimize the lateral
(Continued)

offset and the first derivative of said look-ahead error over time.

11 Claims, 4 Drawing Sheets

(51) Int. Cl.
*B60W 10/20* (2006.01)
*B60W 40/13* (2012.01)
*B62D 15/02* (2006.01)
*G05D 1/02* (2020.01)

(52) U.S. Cl.
CPC ... *G05D 1/0212* (2013.01); *B60W 2040/1315* (2013.01); *G05D 2201/0213* (2013.01)

(56) References Cited

U.S. PATENT DOCUMENTS

| | | | |
|---|---|---|---|
| 2017/0233001 A1* | 8/2017 | Moshchuk | B62D 1/28 701/42 |
| 2017/0291638 A1* | 10/2017 | Gupta | B60W 40/103 |
| 2018/0001891 A1* | 1/2018 | Lauer | B60W 10/18 |
| 2018/0170377 A1* | 6/2018 | Tatsukawa | B62D 15/025 |
| 2018/0348779 A1* | 12/2018 | Oniwa | G06K 9/00798 |
| 2018/0356819 A1* | 12/2018 | Mahabadi | G08G 1/166 |
| 2019/0210598 A1* | 7/2019 | Endo | G08G 1/166 |
| 2020/0094826 A1* | 3/2020 | Abe | B60W 30/143 |
| 2020/0331472 A1* | 10/2020 | Ohmura | B60W 30/045 |
| 2020/0341476 A1* | 10/2020 | Wuthishuwong | G08G 1/167 |
| 2020/0363816 A1* | 11/2020 | Zuo | G05D 1/0217 |
| 2020/0406969 A1* | 12/2020 | Ersal | B60W 30/18163 |
| 2021/0064031 A1* | 3/2021 | Matsuda | G05D 1/0088 |

OTHER PUBLICATIONS

Polychronopoulos, Aris, et al., "Extended path prediction using camera and map data for lane keeping support," Proceedings of the 8th International IEEE Conference on Intelligent Transportation Systems, Vienna, Austria, Sep. 13-16, 2005, pp. 602-607.

* cited by examiner

ADAPTIVE CONTROL METHOD AND SYSTEM IN A TERRESTRIAL VEHICLE FOR TRACKING A ROUTE, PARTICULARLY IN AN AUTONOMOUS DRIVING SCENARIO

CROSS-REFERENCE TO RELATED APPLICATIONS

The present application is a National Stage of International Patent Application No. PCT/IB2017/056753, filed on Oct. 31, 2017, which claims priority to and all the benefits of Italian Patent Application No. 102016000109633, filed on Oct. 31, 2016, both of which are hereby expressly incorporated herein by reference in their entirety.

BACKGROUND OF THE INVENTION

1. Field of the Invention

The present invention generally relates to assisted driving systems for a terrestrial vehicle, and in particular an onboard vehicle system, and a method for assisting a terrestrial vehicle, in particular in an assisted driving or autonomous driving scenario in the tracking of a predetermined trajectory.

More specifically, the invention relates to a method and a system for the lateral movement control of a terrestrial vehicle respectively.

In recent years, progress made in equipping terrestrial vehicles (hereinafter simply "vehicles") with active vehicle driver assistance systems has contributed to a significant improvement in road safety.

The challenge of the future is to design autonomous driving vehicles and to make their operation safe in a road environment crowded with other vehicles, whether autonomous drive vehicles or vehicles driven by a driver.

The operation of an autonomous vehicle is generally governed jointly by a navigation system and a trajectory definition system. The onboard navigation system is designed to program a route on a large scale, i.e. on a road network scale (geographic scale), which occurs by establishing a series of consecutive road segments adapted to connect a predetermined position of origin to a predetermined destination, possibly dynamically variable depending on detected traffic conditions or predefined travel constraints of the road network (e.g., closing certain road sections for work in progress). The trajectory definition system is designed to automatically process vehicle movement trajectories on a local scale, on the order of several tens or hundreds of meters, that are adapted to implement the route programmed by the navigation system. This is done by determining the position, direction and speed of the vehicle over time depending on predetermined movement constraints, such as dynamic constraints of the vehicle—including maximum speed, longitudinal acceleration, steering angle—and environmental constraints—including path obstacles—and depending on predetermined optimizations, such as minimizing the lateral acceleration of the vehicle.

In an autonomous driving context, a vehicle is arranged to follow a predefined urban or extra-urban route by travelling along a series of road sections, determined, for example, by an onboard navigation system, along respective trajectories defined by time-variable Cartesian coordinates $(X_T(t), Y_T(t))$ and calculated in real time as a function of the stretch of road through which the predefined route is achieved and actual traffic conditions concerning the aforementioned section that are detected by sensor systems that equip the vehicle. The system acts to capture the environment surrounding the vehicle and include associated road marking recognition systems, radar or laser sensors, and associated obstacle recognition systems.

In a vehicle, the current position and direction are acquired by merging the data detected by the sensor systems that equip the vehicle (e.g. GPS, video cameras, radar detectors, laser detectors, etc.). The longitudinal control of the vehicle—i.e., its advancement along the calculated trajectory—is carried out by controlling the propulsion system or the braking system, while the lateral control of the vehicle—i.e., the control of the vehicle's direction—is carried out by controlling the steering system.

2. Description of the Related Art

In the prior art, the problem of tracking a predetermined route, or a calculated trajectory belonging to such route, is on first examination independent of the longitudinal control of the vehicle (i.e. the speed at which the vehicle completes the route), but is essentially a problem of the lateral control of the vehicle. It is mathematically equivalent to a problem of minimizing the distance between the current known position of the vehicle (of the vehicle's barycenter or center of mass)—acquired by onboard sensor systems—and a reference trajectory—defined by a trajectory processing module on a local scale depending on the motion constraints of the vehicle.

A crucial aspect in controlling the tracking of a predetermined route by an autonomous driving vehicle is furthermore the possibility to use available information on the reference trajectory in an area in front of the vehicle (in a near future time) to improve the performance of the lateral control system of the vehicle by means of an approach not limited to the current information, but enhanced by a future projection component.

FIG. 1 shows a graph illustrating the parameters used by the most common vehicle lateral control strategies, which are the distance between the center of mass B of the vehicle (the vehicle is collectively indicated at V and represented by schematizing the front steering wheels FW and the rear wheels RW) and the reference trajectory T—hereinafter indicated as a lateral offset e—and the difference between the vehicle's current direction h and the direction tangential to the trajectory T at the point of the trajectory orthogonally closer to the vehicle—hereinafter referred to as the direction error $\Delta\psi$. These parameters are used to define a virtual prediction error $e_p = e + x_p \Delta\psi$, where $x_p$ is the distance between the current position of the vehicle (of the center of mass of the vehicle) and a virtual look-ahead position of the vehicle (of the center of mass of the vehicle) i.e. a position wherein the position of the center of mass of the vehicle is estimated after a predetermined period of time. The aim of the control system is to keep the virtual prediction error $e_p$ equal to zero, which is equivalent to keeping null both the lateral offset and the direction error.

A variation of this technique is based on minimizing a lateral offset expected at a predetermined time interval using a dynamic model of the vehicle.

A different approach is based on the control of the look-ahead error, defined as the distance between a virtual look-ahead position of the vehicle (of the center of mass of the vehicle), i.e., a position wherein the position of the center of mass of the vehicle is estimated after a predetermined period of time or at a predetermined look-ahead distance along the longitudinal axis of the vehicle, and the reference trajectory. The virtual look-ahead position of the vehicle (of the center of mass of the vehicle) is defined as a virtual look-ahead position on the longitudinal axis of the vehicle at a predetermined distance $d_{la}$ from the vehicle's current center of mass, for example, on the order of a few meters or tens of meters under high-speed driving conditions, such as driving along a motorway, or on the order of a meter or lower (more than 20 cm) in low-speed driving conditions, such as driving in an urban center or in a parking operation. The aim of the control system is to minimize the look-ahead error which does not involve minimizing the distance between the position of the vehicle (of the center of mass of the vehicle) and the predetermined trajectory.

In the prior art, other approaches have been considered based, for example, on controlling the yaw speed of the vehicle, where a virtual prediction error is used to generate a yaw speed reference signal.

In no case do the algorithms in the prior art allow the evolution of the reference trajectory to be taken into account to optimize the lateral control of the vehicle over time.

SUMMARY OF THE INVENTION

The object of the present invention is to provide a satisfactory solution to the present problem.

According to the present invention, this object is achieved by a system that provides adaptive control of a terrestrial vehicle for tracking a route.

A further object of the invention is a method for the adaptive control of a terrestrial vehicle for tracking a route.

Particular embodiments are the subject of the dependent claims, the content of which is to be understood as an integral part of the present description.

In summary, the present invention is based on the principle of combining the lateral offset control of the vehicle (of the center of mass of the vehicle)—indicated in the following as $e_{cg}$—and the look-ahead error—indicated in the following as $e_{la}$—defined collectively as the lateral error of the vehicle, to take advantage of the knowledge of the evolution of the reference trajectory over time, particularly in the future. The underlying consideration of the present invention is that, during travelling at a constant speed v along a curved trajectory with a constant radius of curvature $\varrho_T$, the ideal look-ahead error should not necessarily be null, but should be in any case constant.

Therefore, the mathematical problem of tracking a reference trajectory is formulated according to the invention as the problem of minimizing two variables, the lateral offset $e_g$ and the first derivative of the look-ahead error $e'_{la}$.

BRIEF DESCRIPTION OF THE DRAWINGS

Further features and advantages of the invention will be described in greater detail in the following detailed description of one embodiment thereof, given by way of non-limiting example, with reference to the accompanying drawings wherein.

DETAILED DESCRIPTION OF THE INVENTION

Figure 1:
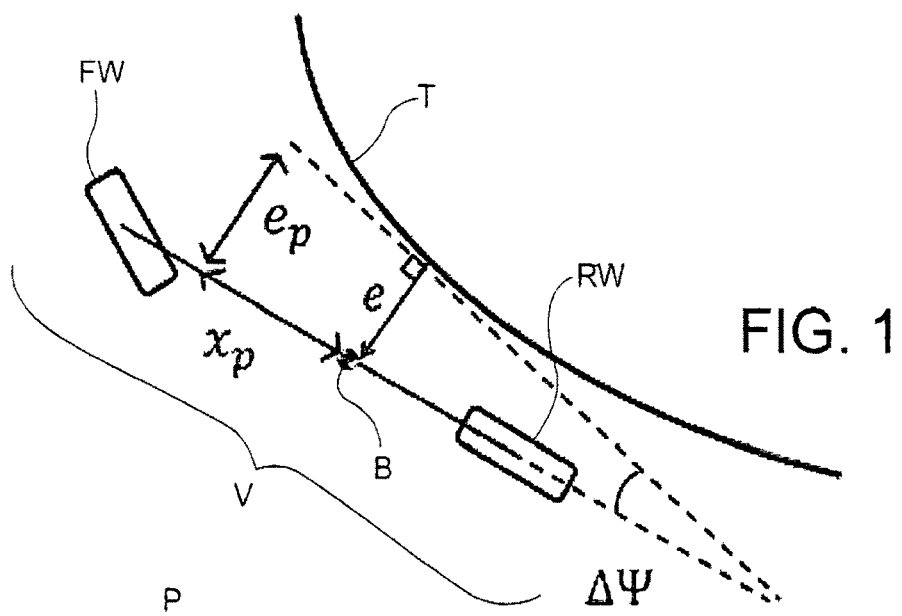
FIG. 1 is a drawing showing a lateral control strategy of a vehicle in tracking a curved trajectory, according to the prior art.
Figure 2:
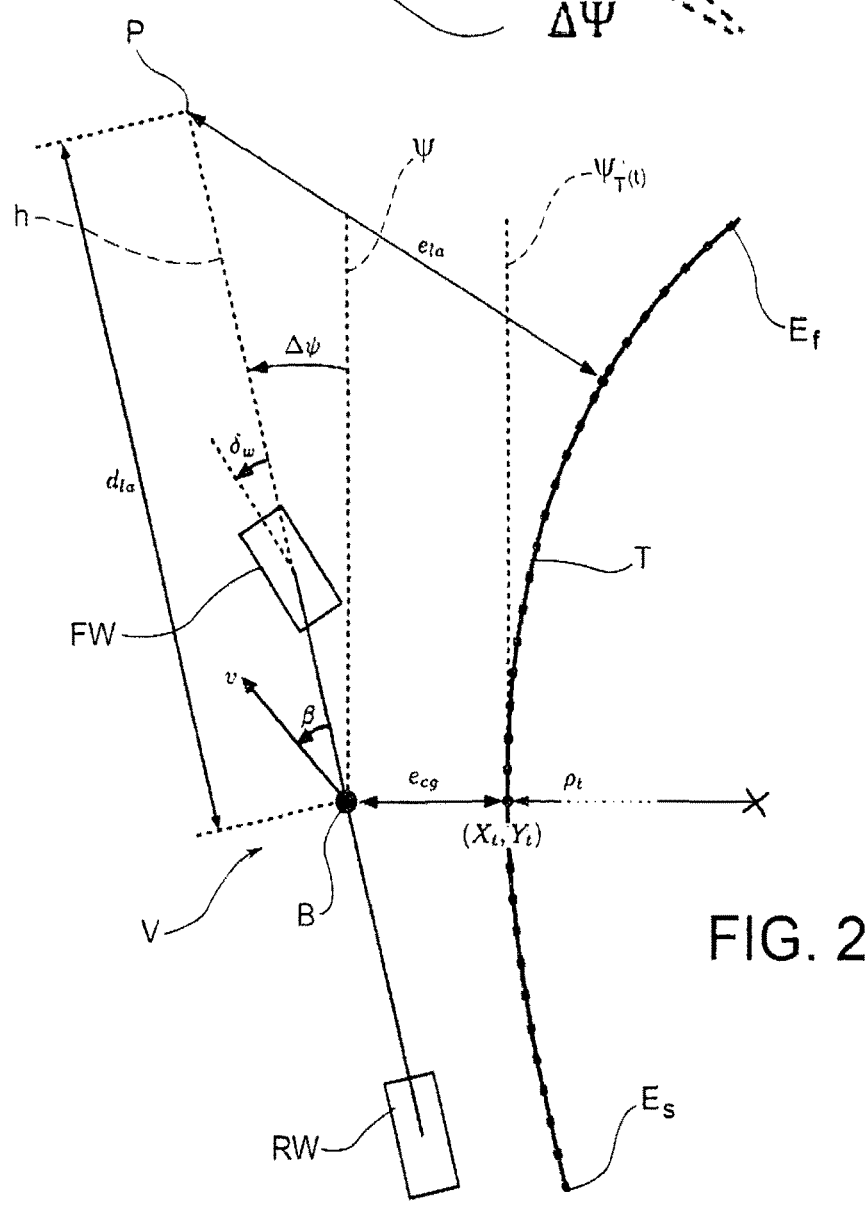
FIG. 2 is a drawing showing a lateral control strategy of a vehicle in tracking a curved trajectory, according to the invention.

FIG. 2 shows a chart illustrating the lateral control strategy of a vehicle V, for example an autonomous driving vehicle, which follows a curved trajectory T in a predefined route at some distance therefrom.

The vehicle V is represented with its center of mass B between the front steering wheels, shown at FW, and the rear wheels, shown at RW.

In the drawing, h indicates the local look-ahead direction of the vehicle as a dotted line, and $\Delta\psi$ indicates the angle between the local look-ahead direction h of the vehicle and the local direction $\psi$ of the trajectory T at the point of the trajectory closest to the vehicle's center of mass. A current steering angle of the vehicle (of the vehicle's front wheels FW) with respect to the local look-ahead direction h of the vehicle is represented at $\delta_w$, and the speed vector of the vehicle is shown applied to the center of mass B, with module v and orientation at an angle $\beta$ with respect to the local look-ahead direction of the vehicle.

Along the local look-ahead direction h, at a predetermined distance from the center of mass of the vehicle, the point P is identified representative of a virtual look-ahead position of the vehicle (of the center of mass of the vehicle), i.e. a position wherein the position of the center of mass of the vehicle is estimated after a predetermined time period as a function of its known local look-ahead direction. Hereinafter $d_{la}$ indicates a virtual look-ahead distance between the virtual look-ahead position of the vehicle (of the center of mass of the vehicle) and the current position of the vehicle (of the center of mass of the vehicle).

The trajectory T, which is a curved trajectory with a (constant or variable) curvature radius $\varrho_T$, is represented as the succession of a discrete plurality of trajectory points which, in the execution of the described method taken as an example, is comprised between a first initial end point $E_s$ and a second final end point $E_f$.

The distance between the vehicle V, i.e. the center of mass B of the vehicle, and the trajectory T represents the lateral offset and is labeled in the figure as $e_{cg}$, while $e_{la}$ indicates the look-ahead error, i.e., the distance between the virtual look-ahead position of the vehicle (of the vehicle's center of mass) P along the local look-ahead direction h and the trajectory T.

Figure 3:
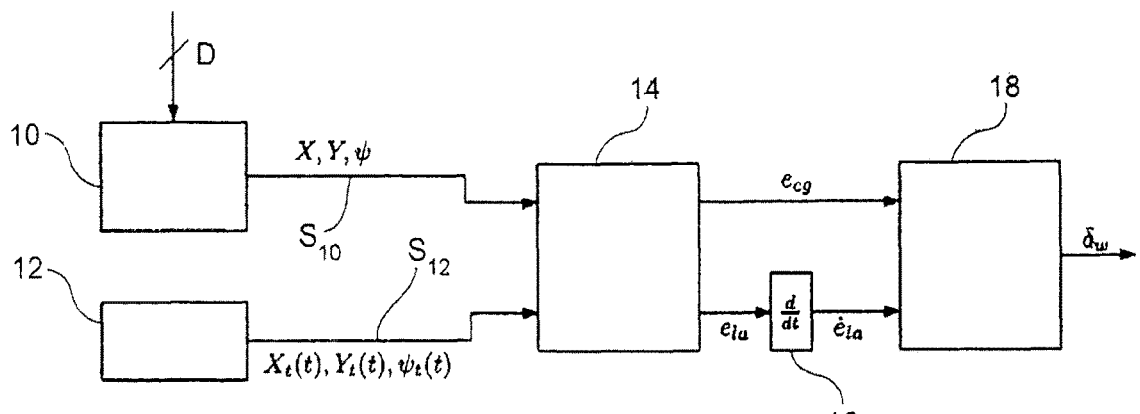
FIG. 3 is a block diagram of a control system of the invention.

FIG. 3 shows a block diagram of a system to control the lateral dynamics of a vehicle according to the invention.

The control system comprises a data collection and merging module 10 arranged for processing the merging of the data D detected by onboard sensors, purely by way of example the vehicle's satellite positioning data and the recognition data of the environment surrounding the vehicle coming from laser sensors, video cameras, radar sensors and ultrasonic sensors or an even partial combination thereof. The module 10 is adapted to emit a signal $s_{10}$ indicating a data trio, respectively the X and Y coordinates of the actual current position and the actual current direction angle $\psi$ of the vehicle.

A trajectory definition module is indicated at 12 and designed to calculate a local trajectory of movement of the vehicle adapted to carry out the route programmed by the navigation system as a function of the environmental constraints (e.g. traffic conditions or obstacles) detected in real time. The trajectory definition module 12 is adapted to emit a signal $s_{12}$ indicating a data trio, respectively, the expected coordinates of the vehicle along a predetermined trajectory T, $X_T(t)$ and $Y_T(t)$, variable over time, and the expected local look-ahead direction, which also varies over time $\psi_T(t)$.

The signals $s_{10}$ and $s_{12}$, respectively emitted by the data collection and merging module 10 and the trajectory definition module 12, are in input to a processing module for calculating the lateral error of the vehicle, indicated collectively at 14, which will be described in greater detail in the following. It is specified henceforth that the figure omits the representation of a longitudinal error calculation module, which is also necessary to carry out a longitudinal control of the vehicle, and thus a complete control of the vehicle dynamics for example in autonomous driving applications, but which is not the subject of the present invention.

The processing module for the calculation of the lateral error of the vehicle is designed to calculate the lateral offset $e_{cg}$ and the look-ahead error $e_{la}$. A differential calculation module, indicated at 16, is designed to perform a calculation operation of the derivative of the look-ahead error $e_{la}$, which is henceforth labeled as $e'_{la}$.

Finally, the lateral offset $e_{cg}$ and the derivative of the look-ahead error $e'_{la}$ are input to a lateral control module 18, which will be better described in the following, adapted to calculate the steering angle $\delta_w$ needed to correct the look-ahead direction of the vehicle such as to allow the tracking of the predefined trajectory T.

With reference to FIGS. 2 and 3, the calculation routine of the lateral offset $e_{cg}$ and the derivative of the look-ahead error $e'_{la}$, which is executed by the processing module for calculating the lateral error of the vehicle 14, is now described in greater detail.

The processing module for calculating the lateral error of the vehicle 14 receives in input the position of the center of mass of the vehicle and its local look-ahead direction, i.e. the data trio (X, Y, $\psi$) and the representation of the trajectory T of the predefined route generated by the trajectory definition module 12, i.e. the data trio ($X_T(t)$, $Y_T(t)$, $\psi_T(t)$).

In order to decouple the problem of longitudinal movement control from the problem of lateral movement control of the vehicle, the lateral offset $e_{Cg}$ is not calculated by considering the coordinates of the trajectory T planned at the current time ($X_T(t_c)$, $Y_T(t_c)$), but is defined as the minimum distance between the center of mass of the vehicle and the entire trajectory T, while the problem of longitudinal control is typically handled by defining a longitudinal reference speed at positions along the time-dependent trajectory T.

In general, the lateral offset is calculated as the distance between the position of the (center of mass of the) vehicle and the straight line passing through a trajectory point closest to the (center of mass of the) vehicle and directed along a local direction (tangential to the trajectory), the trajectory point closest to the (center of mass of the) vehicle being identified as the trajectory point at the minimum Euclidean distance from the position of the center of mass of the vehicle.

Specifically, the lateral offset is calculated by performing in successive iterations the following operations at the lateral error calculation module 14.

First, for each iteration, a trajectory segment comprising a plurality of discrete coordinates of the trajectory T starting from a first initial end point $E_s$, which is identified as the point of minimum distance from the vehicle determined in the previous iteration, up to a second final end point $E_f$, identified by imposing a predetermined length to the trajectory segment comprising a predetermined number of discrete points (which may be either equally spaced or more concentrated in the vicinity of directional variations), wherein said predetermined number of points is high enough to contain a point of minimum distance from the vehicle. In general, the number of discrete points and the length of the trajectory segment depend on the vehicle's current forward speed and the directionality of the same segment. In effect, if there are sudden changes in direction, it is preferable to have shorter segments with respect to the case wherein the vehicle travels a straight trajectory. Alternatively, it is possible to set a constant length for the trajectory segment that is greater than or at least equal to the maximum distance that the vehicle may travel at the maximum theoretical speed at a sample time of the control system.

Therefore, the point of the trajectory segment closest to the (center of mass of the) vehicle is identified by an iterative algorithm comprising the following steps:

1. The distance between the initial end point $E_s$ of the trajectory segment and the (center of mass of the) vehicle is calculated; such distance is provisionally stored as a minimum distance value and the initial end point of the trajectory segment is provisionally identified as the point closest to the (center of mass of the) vehicle;

2. The distance between the successive point on the trajectory segment and the (center of mass of the) vehicle is calculated, and if this value is less than the stored value of the minimum distance, then it is provisionally stored as a new minimum distance value and said point is provisionally identified as a new point closest to the (center of mass of the) vehicle; otherwise, the data obtained from the previous step will be retained;

3. The procedure in the previous step is repeated for all the successive points on the trajectory segment;

4. The algorithm stops when the final end point $E_f$ of the trajectory segment is reached, or before if the calculated distance value is much greater than the stored minimum distance, which may be set at the design stage.

Finally, after the point of the trajectory segment closest to the (center of mass of the) vehicle is identified, the lateral offset is calculated as the distance between the (center of mass of the) vehicle and the straight line passing through the point closest to the (center of mass of the) vehicle and directed in the direction locally tangential to the trajectory (indicated at $\psi_T(t)$ in FIG. 2).

Similarly, the look-ahead error $e_{la}$ is calculated from the knowledge of the vehicle's direction and the virtual look-ahead position of the (center of mass of the) vehicle, shown in FIG. 2 at the point P, i.e. the position wherein the position of the (center of mass of the) vehicle is estimated after a predetermined time period or at a predetermined look-ahead distance. The look-ahead error $e_{la}$ is calculated as the distance of the virtual look-ahead position of the (center of mass of the) vehicle (point P) with respect to the predetermined trajectory, according to the same iterative procedure described above.

1. The distance between the initial end point $E_s$ of the trajectory segment and the look-ahead position of the (center of mass of the) vehicle is calculated; such distance is provisionally stored as a minimum distance value and the first point of the trajectory segment is temporarily identified as the point closest to the virtual look-ahead position of the (center of mass of the) vehicle;

2. The distance between the successive point on the trajectory segment and the virtual look-ahead position of the (center of mass of the) vehicle is calculated, and if this value is less than the minimum distance value stored, then it is provisionally stored as a new minimum distance value and said point is provisionally identified as a new point closest to the virtual look-ahead position of the (center of mass of the) vehicle; otherwise, the data obtained from the previous step will be retained;

3. The procedure in the previous step is repeated for all the successive points on the trajectory segment;

4. The algorithm stops when the final end point $E_f$ of the trajectory segment is reached, or before if the calculated distance value is much greater than the minimum stored distance, which may be set at the design stage.

Finally, after the point of the trajectory segment closest to the virtual look-ahead position of the (center of mass of the) vehicle is identified, the look-ahead error $e_{la}$ is calculated as the distance between the virtual look-ahead position of the (center of mass of the) vehicle and the straight line passing through the point closest to the virtual look-ahead position of the (center of mass of the) vehicle and directed in the direction locally tangential to the trajectory.

The derivative $e'_{la}$ of the look-ahead error is calculated with a high pass filter made as a discrete filter of fixed order n, the cutting frequency of which is a tunable parameter depending on the noise level and on the quantization of the signals received by the onboard geographic positioning system.

Figure 4:
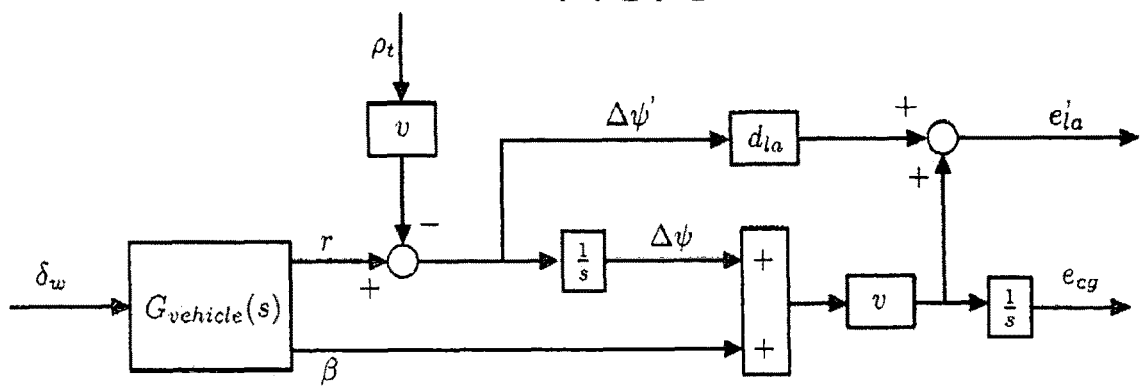
FIG. 4 is a block diagram representing the parameters of the lateral dynamics of the vehicle.

FIG. 4 schematically shows a lateral dynamics model of the vehicle. The system is a system with a single input—the steering angle $\delta_w$ of the vehicle—and multiple output—the lateral offset $e_{cg}$ and the derivative of the look-ahead error $e'_{la}$. Depending on the steering angle $\delta_w$ imposed for the vehicle, for example as determined by the lateral control module 18 of the lateral dynamics control system of the vehicle, belonging to a more general autonomous driving system of the vehicle, the diagram shows the dynamic relationship between the yaw speed r and the drift angle β of the vehicle (i.e., the angle between the vehicle speed referring to the center of mass and the direction of the longitudinal axis), and the two errors $e_{cg}$ and $e'_{la}$, where $G_{vehicle}(s)$ represents—in a known way—the transfer function between the imposed steering angle and the yaw speed r and the drift angle β of the vehicle, obtained by the linearization of the equations that govern the dynamics of the vehicle in the plane. In the figure, the calculation of the two errors $e_{cg}$ and $e'_{la}$ is carried out by obtaining $\Delta\psi'$, which represents the difference between the yaw speed and the trajectory curvature speed at the point closest to the vehicle. By integrating $\Delta\psi'$(block 1/s), $\Delta\psi$ is obtained, i.e. the difference between the vehicle orientation and the orientation of the reference trajectory at the point closest to the vehicle. By adding $\Delta\psi$ and the drift angle β of the vehicle and multiplying by the longitudinal velocity of the vehicle v, the lateral offset speed is calculated; by integrating the latter (block 1/s), the error at the center of mass or lateral offset $e_{cg}$ is obtained. By adding the speed of the lateral offset with the product of $\Delta\psi'$ and the virtual look-ahead distance $d_{la}$, the derivative of the look-ahead error $e'_{la}$ is calculated.

FIG. 4 thus represents one of the possible ways wherein the look-ahead of the position of the center of mass of the vehicle may be calculated at a predetermined distance, which is based on the hypothesis that the vehicle continues along its current longitudinal direction.

The control module 18 is preferably synthesized to apply an $H_\infty$ control method and implemented on the basis of the lateral dynamics model of the vehicle defined in FIG. 4. The $H_\infty$ control problem is thus expressed as a mathematical optimization problem, whereby the desired performance of the control module 18 is defined by weight functions applied to a plurality of variables of interest, which in this case are the steering angle $\delta_w$, the curvature radius $\varrho_t$, of the predetermined trajectory the lateral offset $e_{cg}$ and the look-ahead error $e_{la}$.

Figure 5A:
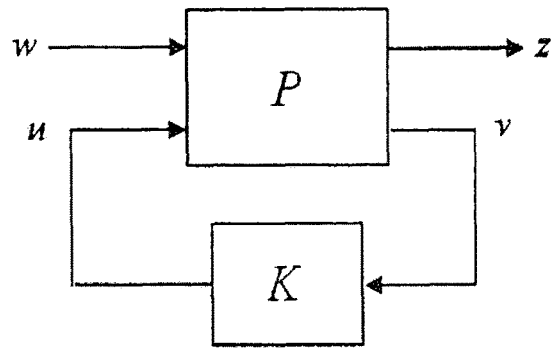
FIG. 5A is a diagram of an control system.

An $H_\infty$ control model of a system P is shown in FIG. 5a. The system P has two inputs, respectively, an exogenous input w which includes reference signals and disturbances and an input of controlled variables u, and has two outputs, an output of performance variables z, which includes error signals that one wishes to minimize, and an output of measured variables v, which includes signals that are used to control the system, respectively. The measured variables v are used in a block K to calculate the controlled variables input to the system u.

Figure 5B:
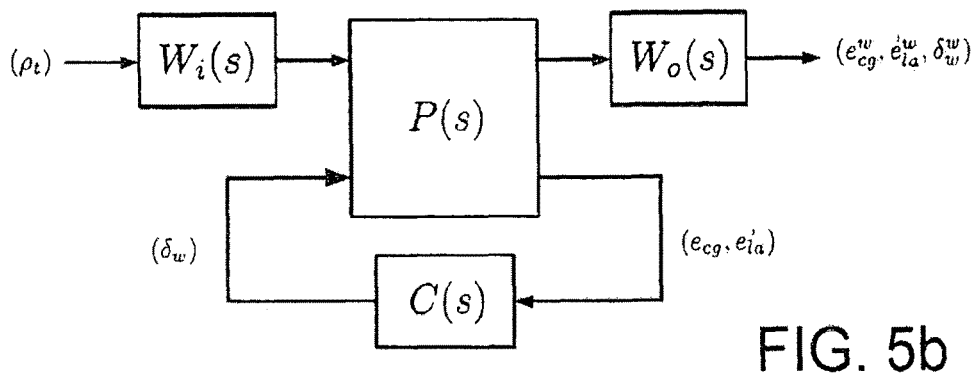
FIG. 5B is a diagram of another control system.

FIG. 5b shows the $H_\infty$ control model of the vehicle's steering system and of the vehicle, which takes into account both the steering dynamics and the lateral dynamics of the vehicle, where P(s) indicates the vehicle and the steering system of the vehicle as a whole and C(s) indicates the lateral control module 18, wherein the steering angle ($\delta_w$) as an input variable and the variables representative of the errors calculated according to the present invention ($e_{cg}$, $e'_{la}$)—which are the performance variables of the system—are processed through respective weighing modules generally indicated $W_o(s)$, and indicated $\delta^w_w$, $e^w_{cg}$ and $e'^w_{la}$ respectively. The variables $\delta^w_w$, $e^w_{cg}$ and $e'^w_{la}$ may be represented as the output of respective dynamic filters ($W_o^{\{1\}}$, $W_o^{\{2\}}$, $W_o^{\{3\}}$) and may be represented in the Laplace domain as follows:

$$\delta^w_w(s) = W_o^{\{1\}}(s) * \delta_w(s);$$

$$e^w_{cg}(s) = W_o^{\{2\}}(s) * e_{cg}(s);$$

$$e'^w_{ka}(s) = W_o^{\{3\}}(s) * e'_{la}(s);$$

Preferably, also the exogenous input reference signal, the local curvature radius $\varrho_t$, of the predetermined trajectory is processed through a respective weighing module $W_i(s)$.

Weighing the variables allows the magnitude of errors in the frequency domain to be specified based on the desired performance and the behavior of the controller to be regulated for greater response speed or greater robustness to external disturbances. For example, a small trajectory tracking error may be favored at the expense of high actuation energy, or a different balance may be set between the different aspects of control (tracking error, actuation cost, robustness to measurement errors, and rejection of load disturbances).

Unlike known algorithms based on minimizing the virtual prediction error, the control system and method of the invention allow advantageously for the future evolution of the curvature of the predetermined trajectory to be taken into account by virtue of the fact that look-ahead error is determined, i.e., a real distance is calculated between the virtual look-ahead position of the (center of mass of the) vehicle and the predetermined trajectory, whereby the control may anticipate a vehicle's maneuver of entry into a curve and overcome the inconvenience of a delay in the tracking of the predefined trajectory that is introduced by the vehicle dynamics. Conveniently, the virtual look-head position of the (center of mass of the) vehicle, or better yet the virtual look-ahead distance, may be considered a tunable parameter to adjust the anticipatory action of the control, improving the predictive readiness of the system of the invention, particularly in the case of high dynamics maneuvers.

Figure 6:
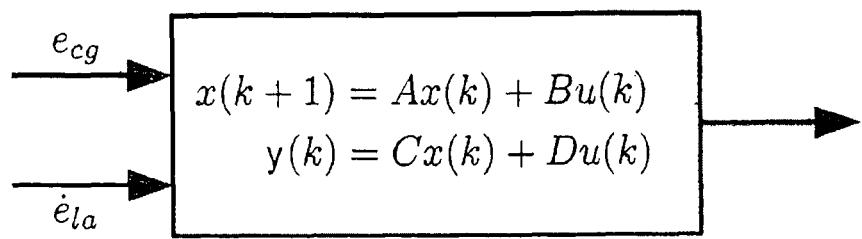
FIG. 6 is an exemplification of the control system of the invention in a first simplified embodiment.
Figure 7:
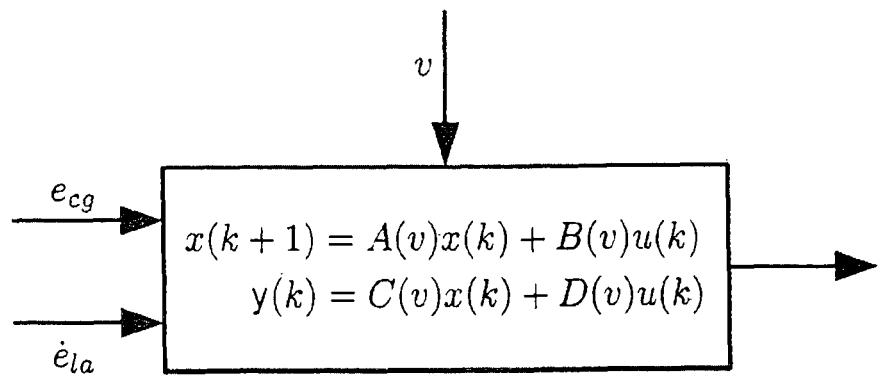
FIG. 7 is an exemplification of the control system of the invention in an improved embodiment.

FIGS. 6 and 7 schematize the algorithm at the base of the lateral control module or controller 18, which—as mentioned above—is an $H_\infty$-type control optimization algorithm.

Specifically, the control algorithm is a function of the lateral dynamics model of the vehicle defined in FIG. 4 and the weight functions attributed to variables $\delta^w_w$, $e^w_{cg}$ and $e^w_{la}$.

The lateral control module or controller 18 is a dynamic system that may be represented by equations in the state space, characterized by the matrices A, B, C, D:

$$x(k+1)=Ax(k)+Bu(k)$$

$$y(k)=Cx(k)+Du(k)$$

The output y is the steering angle and the input u is a vector of two variables, respectively the lateral offset $e_{cg}$ and the derivative of the prediction error $e'_{la}$. A is an n×n matrix where n is the order of the controller that depends on the order of the system and on the order of weight functions, B is an n×2 matrix, C is a 1×n matrix and D is a 1×2 matrix. The matrices A, B, C, D are the result of a mathematical optimization performed by defining the vehicle model and the weights, and have no representation in closed form.

In an improved embodiment, the control algorithm is made in such a way as to take into account the speed v of the vehicle and is shown in FIG. 7. It is known in fact that the operation speed of the vehicle influences its dynamics. In this case, the control algorithm also receives as input the current longitudinal speed of the vehicle and calculates the matrices A(v), B(v), C(v) and D(v), which are therefore dependent on the vehicle speed. In this case, the lateral control module or controller 18 is an LPV (linear parameter-varying or variable parameter linear control) controller, and may be represented with equations in the state space:

$$x(k+1)=A(v)x(k)+B(v)u(k)$$

$$y(k)=C(v)x(k)+D(v)u(k)$$

This means that the control mode is advantageously programmed over time as a function of the speed of the vehicle, for example with a frequency of 50 Hz, whereby the steering angle is determined on the basis of the lateral offset $e_{cg}$, of the derivative of the look-ahead error $e'_{la}$ and of the value of the matrices evaluated at the current speed of the vehicle.

The control of the invention has superior performance compared to a classic control based exclusively on the knowledge of the look-ahead error or compared to a classic control based exclusively on the knowledge of the lateral offset.

Figure 8:
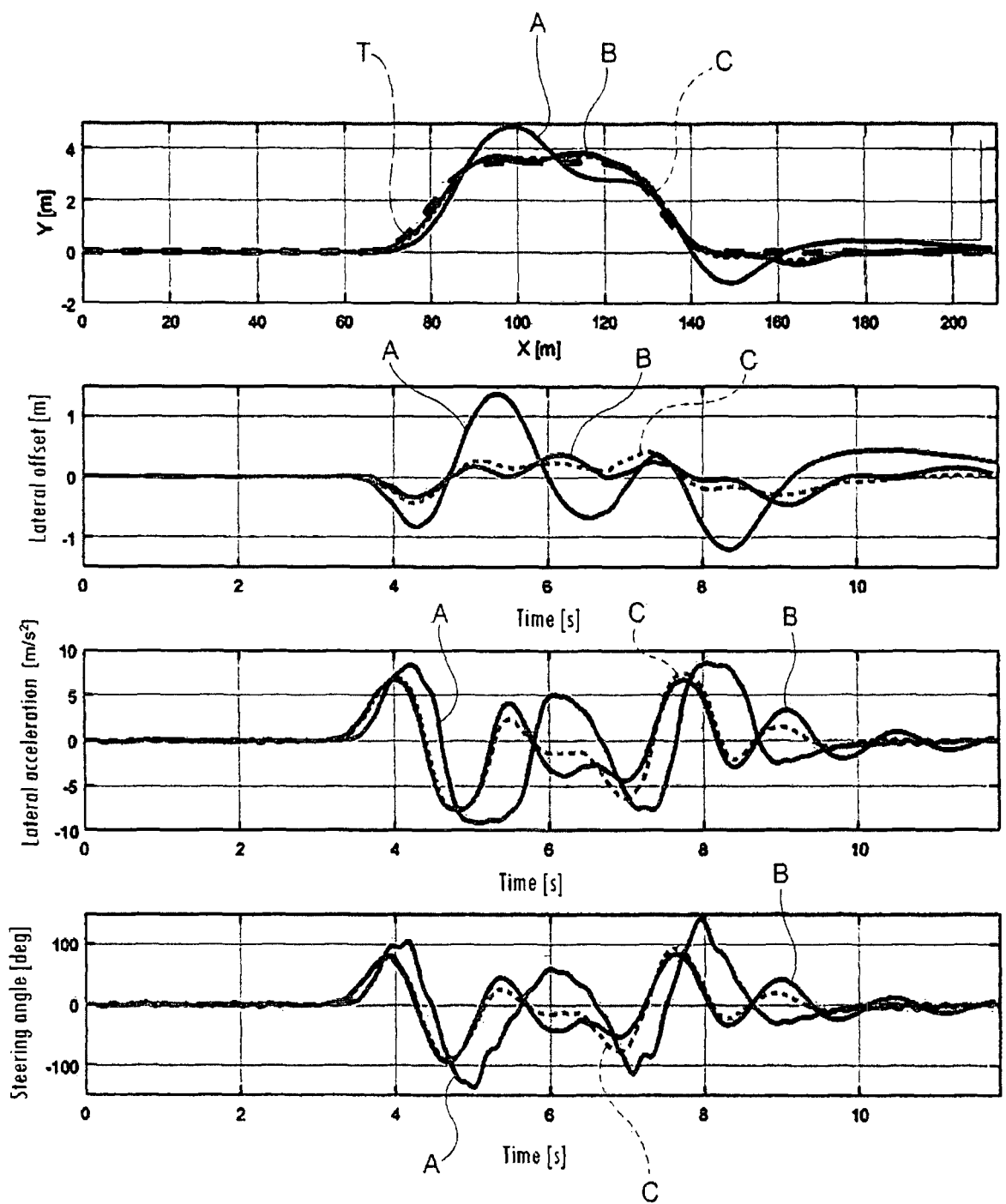
FIG. 8 shows a series of indicative charts of the performance comparing different control systems.

For a better appreciation of the excellence of the control of the invention, FIG. 8 shows the results of a maneuver performed by an autonomous driving vehicle to avoid an obstacle, actuated by three different controllers, respectively a classic controller designed to minimize the lateral offset (curve A), an $H_\infty$ controller according to the invention (curve B), and an LPV controller similar to the $H_\infty$ controller which also takes into account the speed of the vehicle to adjust the gain of the control system and the weights of the variables (curve C).

In the first graph from the top, the absolute lateral position of the (center of mass of the) vehicle is shown in a reference system X, Y, where X evolves along the direction of travel and Y is the direction orthogonal to X on the plane of travel. The curve T shows with hatched lines the predefined reference trajectory. It is evident in the graph that with a classic control, the vehicle is delayed in tracking the predefined trajectory.

In the second graph from the top, the evolution over time of the lateral offset is shown. Also in this case, it should be noted that a classic control allows for a lateral offset for much of the time greater than the lateral offset allowed by the control according to the two embodiments of the invention, and is extremely variable in absolute value.

In the third graph from the top, the trend of the lateral acceleration is traced over time, as a result of the maneuvers required to recover the lateral offset that is created. Also, this graph shows a clear delay of the classic control in tracking the predefined trajectory.

Finally, in the fourth graph (the last graph on the bottom), the trend of the steering angle over time is traced, which represents the command imposed to the vehicle by the controller. The summation of the disadvantages of the known technique (curve A) is evident in terms of delay and greater amplitude of the required corrections.

Ultimately, the graphs in FIG. 8 clearly show that the introduction of a multi-objective approach that is the subject of the invention, i.e., an approach aimed at minimizing both the lateral offset and the variation of the look-ahead error, results in improved performance of the lateral control of a vehicle, in particular an autonomous driving vehicle, essentially due to the improved ability to anticipate a curve or directional change, while at the same time giving relevance to the actual error of tracking of the predetermined trajectory at the center of mass of the vehicle.

Figure 9:
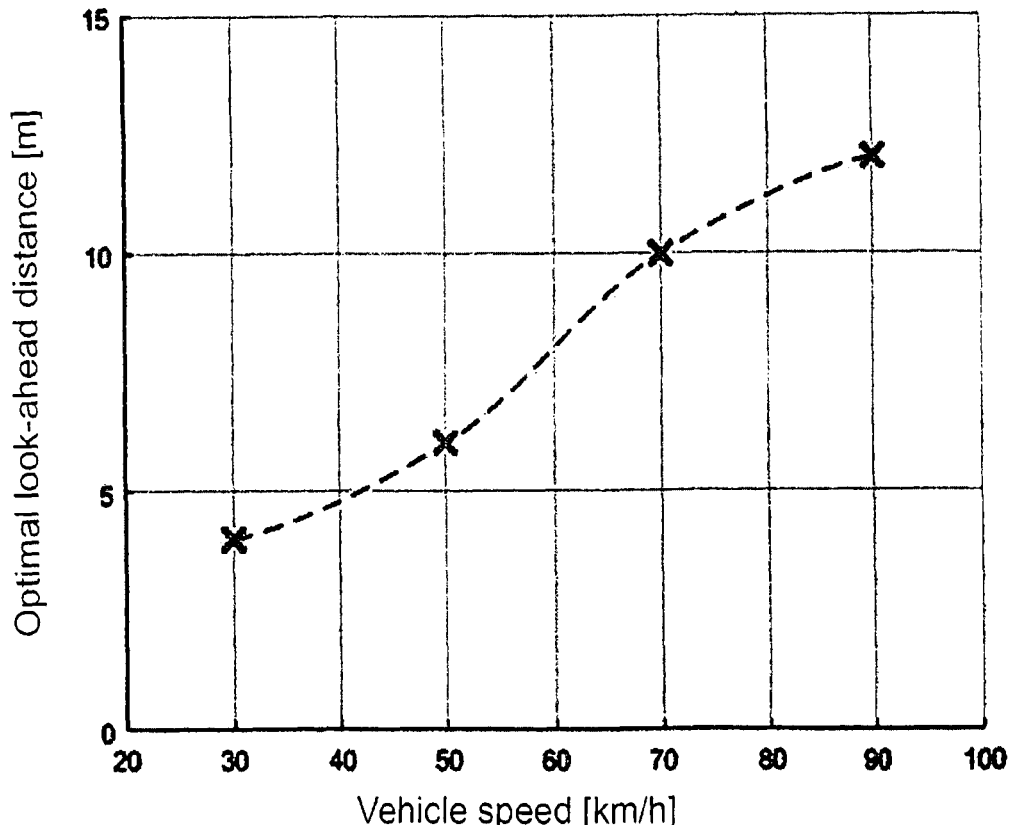
FIG. 9 is a graph showing the optimum virtual look-ahead distance along the vehicle look-ahead direction as a function of the speed of the vehicle.

In addition to the foregoing, it is possible to recognize that also the vehicle's virtual look-ahead distance is a control parameter that may be adjusted according to the speed, and in FIG. 9 the influence of the vehicle speed in determining the optimal virtual look-ahead distance is shown, obtained by comparing the mean squared error of the lateral offset for different virtual look-ahead distances at different speeds. In essence, as the speed increases, the optimal virtual look-ahead distance to be set in the calculation of the look-ahead error may increase according to a predetermined function, so as to give the vehicle different behaviors as regards the tracking error, cost of implementation, robustness to measurement errors and rejection of load disturbances, for example in an approximately linear way.

Naturally, without altering the principle of the invention, the embodiments and the details of implementation may vary widely with respect to that which is described and illustrated purely by way of non-limiting example, without thereby departing from the scope of protection of the invention defined by the accompanying claims.

The invention claimed is:

1. A method for the control of the lateral movement of a terrestrial vehicle arranged to track a predetermined trajectory in an assisted driving or autonomous driving scenario, said method comprising the steps of:

determining a lateral offset of a vehicle center of mass from a predetermined trajectory by determining a distance between a position of the vehicle center of mass and a straight line passing through a trajectory point closest to the vehicle center of mass and directed along a local direction tangential to said trajectory, the trajectory point closest to the vehicle center of mass being identified as the trajectory point at a minimum Euclidean distance from the position of the vehicle center of mass;

wherein the trajectory point at the minimum Euclidean distance from the position of the vehicle center of mass is determined by:

(a) calculating a first distance between an initial end point $E_s$ of a predetermined trajectory segment and the vehicle center of mass, and storing said first distance as a value of minimum distance and said initial end point of the a trajectory segment as a point closest to the vehicle center of mass;

(b) calculating a second distance between a subsequent point of a predetermined succession of discrete points on said trajectory segment and the vehicle center of mass and, if said second distance is lower than said first stored distance, storing said second distance as a value of minimum distance and said subsequent point of trajectory segment as a point closest to the vehicle center of mass; and (c) iterating step (b) for all the points of said succession of discrete points on said trajectory segment;

controlling a steering angle of the vehicle so as to minimize said lateral offset;

determining a look-ahead error defined as a distance of a virtual look-ahead position of the vehicle center of mass from said predetermined trajectory; and controlling a steering angle of the vehicle so as to also minimize the first derivative over time of said look-ahead error.

2. The method as set forth in claim 1, wherein determining a look- ahead error comprises:

determining a virtual look-ahead position for the vehicle center of mass along a current look-ahead direction of the vehicle after a predetermined period of time or at a predetermined look-ahead distance; and determining a distance between said virtual look-ahead position for the vehicle center of mass and the straight line passing through a trajectory point closest to the virtual look-ahead position for the vehicle center of mass and directed along a local direction tangential to said trajectory, the trajectory point closest to the virtual look-ahead position for the vehicle center of mass being identified as the trajectory point at the minimum Euclidean distance from the virtual look-ahead position for the vehicle center of mass.

3. The method as set forth in claim 2, wherein the trajectory point at the minimum Euclidean distance from the virtual look-ahead position for the vehicle center of mass is determined by:

(a) calculating a first distance between an initial end point $E_s$ of a predetermined trajectory segment and the virtual look-ahead position for the vehicle center of mass, and storing said first distance as a value of minimum distance and said initial end point of the trajectory segment as the point closest to the virtual look-ahead position for the vehicle center of mass;

(b) calculating a second distance between a subsequent point of a predetermined succession of discrete points on said trajectory segment and the virtual look-ahead position for the vehicle center of mass and, if said second distance is lower than said stored first distance, storing said second distance as the minimum distance value and said subsequent point of the trajectory segment as the closest point to the virtual look-ahead position for the vehicle center of mass; and (c) iterating step (b) for all the points of said succession of discrete points on said trajectory segment.

4. The method as set forth in claim 1, wherein controlling the steering angle of the vehicle comprises applying an $H_\infty$ control method wherein an exogenous input includes a local curvature radius of said predefined trajectory, an input of the controlled variables includes the steering angle of the vehicle, a performance variable output includes the steering angle of the vehicle, a lateral offset and the derivative of the look-ahead error, and an output of measured variables includes the lateral offset and the derivative of the look-ahead error.

5. The method as set forth in claim 4, wherein the steering angle of the vehicle, the lateral offset, the derivative of the look-ahead error, and preferably the curvature radius of the predetermined trajectory, are processed through respective weight functions.

6. The method as set forth in claim 1, wherein the length of the trajectory segment is also determined as a function of the vehicle current speed.

7. The method as set forth in claim 2, wherein the virtual look-ahead distance for the vehicle is also determined as a function of the vehicle current speed.

8. A system for the control of the lateral movement of a terrestrial vehicle arranged to track a predetermined trajectory in an assisted driving or autonomous driving scenario, comprising:

acquisition member of vehicle position data, adapted to emit a first signal indicative of coordinates of a current actual position of the vehicle and of an angle of the actual current direction of the vehicle;

a vehicle trajectory module, arranged for calculating a local trajectory of the vehicle movement and adapted to emit a second signal indicative of the expected coordinates of the vehicle along said predefined trajectory and of an expected local look-ahead direction of the vehicle;

a controller that calculates a lateral error of the vehicle with respect to said predetermined trajectory, and that is adapted to receive said first and second signal and arranged for determining a lateral offset and a look-ahead error based on said first and second signal; and a lateral control module of the vehicle, adapted to receive said lateral offset and a time derivative of the look-ahead error, and arranged for emitting a signal indicative of a steering angle required to operate a correction of the look-ahead direction of the vehicle so as to allow tracking the predefined trajectory;

wherein the lateral control module of the vehicle is programmed to control the lateral movement of a terrestrial vehicle.

9. A method for the control of the lateral movement of a terrestrial vehicle arranged to track a predetermined trajectory in an assisted driving or autonomous driving scenario, comprising the steps of:

determining a lateral offset of the vehicle center of mass from said predetermined trajectory;

controlling a steering angle of the vehicle so as to minimize said lateral offset, determining a look-ahead error defined as a distance of a virtual look-ahead position of the vehicle center of mass from said predetermined trajectory, wherein determining a look-ahead error includes the steps of:

determining the virtual look-ahead position for the vehicle center of mass along a current look-ahead direction of the vehicle after a predetermined period of time or at a predetermined look-ahead distance; and determining the distance between said virtual look-ahead position for the vehicle center of mass and the straight line passing through a trajectory point closest to the virtual look-ahead position for the vehicle center of mass and directed along a local direction tangential to said trajectory, the trajectory point closest to the virtual look-ahead position for the vehicle center of mass being identified as the trajectory point at the minimum Euclidean distance from the virtual look-ahead position for the vehicle center of mass;

wherein the trajectory point at the minimum Euclidean distance from the virtual look-ahead position for the vehicle center of mass is determined by:

(a) calculating a first distance between an initial end point $E_s$ of a predetermined trajectory segment and the virtual look-ahead position for the vehicle center of mass, and storing said first distance as a value of minimum distance and said initial end point of the trajectory segment as the point closest to the virtual look-ahead position for the vehicle center of mass;

(b) calculating a second distance between a subsequent point of a predetermined succession of discrete points on said trajectory segment and the virtual look-ahead position for the vehicle center of mass and, if said second distance is lower than said stored first distance, storing said second distance as the minimum distance value and said subsequent point of the trajectory segment as the closest point to the virtual look-ahead position for the vehicle center of mass; and (c) iterating step (b) for all the points of said succession of discrete points on said trajectory segment; and controlling the steering angle of the vehicle so as to also minimize the first derivative over time of said look-ahead error.

10. A method for the control of the lateral movement of a terrestrial vehicle arranged to track a predetermined trajectory in an assisted driving or autonomous driving scenario, comprising the steps of:

determining a lateral offset of the vehicle center of mass from said predetermined trajectory;

controlling a steering angle of the vehicle so as to minimize said lateral offset, determining a look-ahead error defined as a distance of a virtual look-ahead position of the vehicle center of mass from said predetermined trajectory; and controlling the steering angle of the vehicle so as to also minimize the first derivative over time of said look-ahead error, wherein controlling the steering angle of the vehicle includes the steps of applying an $H_\infty$ control method wherein an exogenous input includes a local curvature radius of said predefined trajectory, an input of the controlled variables includes the steering angle of the vehicle, a performance variable output includes the steering angle of the vehicle, the lateral offset and the derivative of the look-ahead error, and an output of measured variables includes the lateral offset and the derivative of the look-ahead error.

11. A method for the control of the lateral movement of a terrestrial vehicle arranged to track a predetermined trajectory in an assisted driving or autonomous driving scenario, comprising the steps of:

determining a lateral offset of the vehicle center of mass from said predetermined trajectory;

controlling a steering angle of the vehicle so as to minimize said lateral offset, determining a look-ahead error defined as a distance of a virtual look-ahead position of the vehicle center of mass from said predetermined trajectory, wherein determining the look-ahead error includes the steps of:

determining the virtual look-ahead position for the vehicle center of mass along a current look-ahead direction of the vehicle after a predetermined period of time or at a predetermined look-ahead distance determined as a function of the vehicle current speed; and determining the distance between said virtual look-ahead position for the vehicle center of mass and the straight line passing through a trajectory point closest to the virtual look-ahead position for the vehicle center of mass and directed along a local direction tangential to said trajectory, the trajectory point closest to the virtual look-ahead position for the vehicle center of mass being identified as the trajectory point at the minimum Euclidean distance from the virtual look-ahead position for the vehicle center of mass; and controlling the steering angle of the vehicle so as to also minimize the first derivative over time of said look-ahead error.

* * * * *

UNITED STATES PATENT AND TRADEMARK OFFICE
CERTIFICATE OF CORRECTION

| | |
|---|---|
| PATENT NO. | : 11,318,936 B2 |
| APPLICATION NO. | : 16/345060 |
| DATED | : May 3, 2022 |
| INVENTOR(S) | : Michele Giorelli et al. |

It is certified that error appears in the above-identified patent and that said Letters Patent is hereby corrected as shown below:

In the Claims

Column 11, Line 11 (Claim 1) delete "of the a trajectory segment" and insert therefor --of a trajectory segment--.

Signed and Sealed this
Nineteenth Day of December, 2023

Katherine Kelly Vidal
*Director of the United States Patent and Trademark Office*